United States Patent Office 3,264,264
Patented August 2, 1966

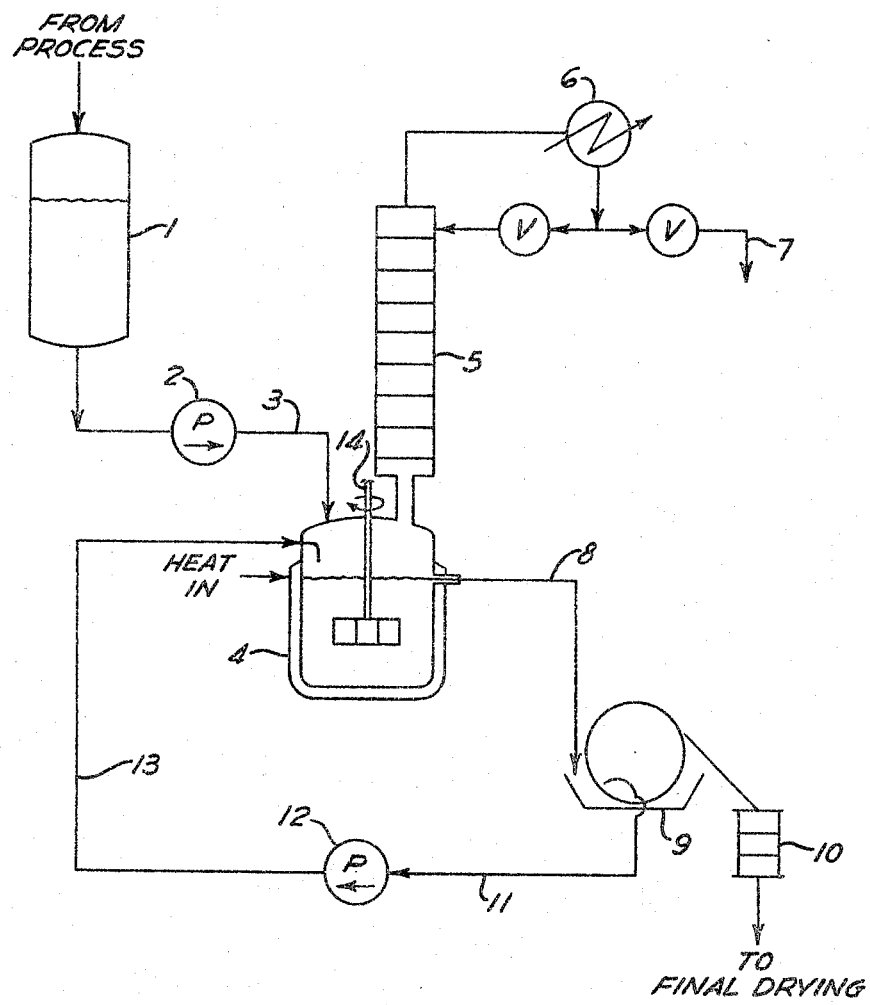

3,264,264
POLYCARBONATE RECOVERY SYSTEM
Peter J. Baker, New Martinsville, W. Va., assignor to Mobay Chemical Company, Pittsburgh, Pa., a corporation of Delaware
Filed May 22, 1963, Ser. No. 282,290
11 Claims. (Cl. 260—47)

This invention relates to polycarbonates and more specifically to a novel process for the recovery of polycarbonates from solution.

The production of high molecular weight polycarbonates is well known in the prior art, for example, those described in U.S. Patents 3,028,365, 3,043,800, and 3,043,802 and in Canadian Patents 578,795, 594,405, and 611,970. Probably the most commercially used process for the production of these polycarbonates involves the phosgenation of 2,2-bis(4-hydroxy phenyl)-propane in a methylene chloride solvent. This process is described in detail in above-noted U.S. Patent 3,028,365. The phosgenation of the above propane (Bisphenol A) takes place in the presence of a solvent usually methylene chloride. The resulting polycarbonate product, therefore, is a solution of polycarbonate having a concentration of from about 1 to about 30 or 40% polycarbonate. It is desirable for many reasons that the polycarbonate formed be recovered as a solid from solution. There are known methods of accomplishing this such as, for example, extrusion, crystallization, evaporation and precipitation procedures. In the precipitation processes, the polycarbonate is usually precipitated from solution by the use of various non-solvents and thereafter separated by filtration or other convenient means. The solvent and non-solvent mixture remaining is then further processed to completely separate the solvent from the non-solvent. A serious disadvantage of this process is the loss of unrecovered polycarbonates which remain in a portion of the discarded filtrate solution. By not utilizing this unrecovered polycarbonate, it is estimated that from about 2 to about 15% yield loss occurs. A further drawback of this prior art precipitation procedure is the difficulty involved in the complete separation of the solvent from the non-solvent used in the precipitation. Because of the presence of unrecovered polycarbonate in the filtrate or solvent-non-solvent solution, the complete separation of these two solution components becomes extremely difficult. This is caused by poor heat transfer resulting from the depositing of unrecovered polycarbonate on the heat transfer surfaces of the separation apparatus.

It is, therefore, an object of this invention to provide a process for the recovery of polycarbonates from solution which is devoid of the above-noted disadvantages. It is another object of this invention to provide a convenient, economical and continuous process for the substantially total recovery of polycarbonates from a solution thereof. Another object of this invention is to provide a process for the recovery of polycarbonate from a solution thereof whereby any unrecovered polycarbonate remains in the production system and is eventually converted into recoverable polycarbonate. Another object of this invention is to provide a continuous process for the production of substantially solid polycarbonates which is easily adapted to large scale commercial application. A still further object of this invention is to provide a continuous process for the recovery of solid polycarbonate from a solution thereof whereby separation of all the solvent from the non-solvent is not required. A yet further object of this invention is to provide a process for the recovery of polycarbonate from a liquid medium whereby the heat and energy requirements are comparatively low.

The foregoing objects and others which will become apparent from the following description are accomplished in accordance with this invention, generally speaking, by providing a continuous process for the substantially complete separation of solid polycarbonate from a solution whereby said polycarbonate solution is continuously heated and mixed in a mixing vessel with a precipitating solution to form a precipitate (a liquid in which the polycarbonate is substantially insoluble) and a slurry obtained. The temperature during mixing must be above the boiling point of the solvent in said polycarbonate solution and regulated in such a manner that the amount of solvent which is introduced to the mixing vessel via said polycarbonate solution is removed by distillation during the mixing step. After the solvent has been removed, the content of the remaining slurry is maintained so as to contain from about 1 to about 15 parts by weight polycarbonate, from about 35 to about 65 parts by weight of polycarbonate solvent and from about 35 to about 65 parts by weight of polycarbonate non-solvent. After this slurry leaves the mixing vessel, the precipitated polycarbonate is separated from the liquid phase at a suitable separation means, and the liquid phase remaining which includes unrecovered polycarbonate is continuously recycled to the mixing vessel where it is mixed with a fresh supply of polycarbonate solution.

The precipitating solution at the time of admixture with the polycarbonate solution contains a polycarbonate solvent and a polycarbonate non-solvent in such proportions that after mixing and after removal of solvent (in the amount initially added via the polycarbonate solution) the resulting slurry contains the components in the amounts above specified. The amounts of polycarbonate solution and precipitating solution which are mixed will, of course, depend on the concentration of the polycarbonate solution and the specific solvents and non-solvents used. The polycarbonate solvent used in the precipitating solution must have a boiling point lower than the boiling point of the non-solvent used. In a preferred embodiment of this invention the mixing is accomplished by a blending of the feed streams under substantially turbulent conditions of agitation and at a rate such that the average residence time in the mixing vessel is from about 20 min. to about 5 hours. The concentration of the polycarbonate solid in the resulting slurry should, after mixing and solvent removal as mentioned above, be from about 1 to about 15 parts in the solvent-non-solvent solution.

The components in the slurry after mixing and solvent removal must be controlled carefully to be in the above-indicated proportions. If the amount of solvent, for example, is permitted to fall below about 35% (of the liquid portion of the slurry) the polycarbonate product recovered becomes a low bulk density material, fibrous or strongly in appearance. On the other hand, if the solvent is caused to be present in the slurry after mixing and solvent removal in an amount greater than about 65% (of the liquid portion of the slurry) the polycarbonate will be so incompletely precipitated from the polycarbonate solution so as to result in a process which will be commercially impractical. The removal of solvent from the mixing vessel in an amount sufficient to maintain the above polycarbonate solvent and non-solvent ratio and/or approximately equal to that amount of solvent added with the polycarbonate solution is also critical to the functioning of this process. If this solvent is not removed in this stated amount, the system will eventually become diluted and little precipitation, if any, will occur. The solvent used must have a boiling point lower than that of the non-solvent, and must be miscible with the non-solvent used.

In a preferred embodiment, a polycarbonate solution containing about 7 to about 20% polycarbonate and the remainder methylene chloride solvent is added to a mixing device and normally mixed at a temperature above 40° C. with a precipitating solution containing from about 35 to about 65% heptane and the remainder methylene chloride. That amount of methylene chloride to be removed during mixing in the mixing device is approximately equal to the amount of solvent that is added in the polycarbonate solution added. The resulting slurry overflow is then filtered to remove the precipitated polycarbonate and the filtrate recycled back to the mixing vessel where it is mixed and heated with a fresh supply of polycarbonate. Thus in the process of this invention the unrecovered polycarbonate present is never lost to the system, but remains in equilibrium in this process, eventually converted into recoverable polycarbonate.

Various chemically inert solvents and chemically inert non-solvents may be used in the process of this invention depending on the particular solvent used in the initial polycarbonate production process. Some of these specific solvents include methylene chloride, tetrachloroethane, ethylene dichloride, chlorobenzene, dichlorobenzene, chloroform, trichloroethane, 1,2-dichloroethane, thiophene, dioxane, tetrahydrofuran and mixtures thereof. Generally speaking, a good solvent for polycarbonates is one which will dissolve from about 1 to about 30 or 40 parts of polycarbonate in about 60 to 100 parts of solvent. The non-solvents and solvents used in the present invention are chemically inert to each other and to the polycarbonate solution components. The non-solvents generally are liquids whereby less than from about 0.1 to 1 part of the polycarbonate is soluble in about 100 parts of non-solvent. As above mentioned, it is necessary that the solvent used have a boiling point lower than that of the non-solvent.

Typical of the non-solvents that can be used are aliphatic hydrocarbons having up to about 20 carbon atoms such as, for example, n-heptane, n-hexane, n-pentane, n-octane, n-nonane, n-decane, n-undecane, 2-methylpentane, 3-methylpentane, 2,2-dimethylbutane, 2,3-dimethylbutane, the various heptanes particularly the isomers such as 2-methylhexane, 3-methylhexane, 2,2-dimethylpentane, 2,3-dimethylpentane, 3-ethylpentane, 2,2,3-trimethylbutane and mixtures thereof. Other non-solvents are acetone, ethyl acetate, toluene, trichloroethylene, carbon tetrachloride, nitromethane, acetonitrile, 1,1-dichloroethane and dialkyl carbonates. Liquid alcohols may also be used as the non-solvent of the present invention, typical alcohols are isobutanol, secondary butanol, n-butanol, methanol, ethanol, propanol, n-hexyl alcohol and mixtures thereof.

Various polycarbonate solutions may be used in the process of this invention, such as, for example, polycarbonate solutions containing from about 1 to 30 or 40% polycarbonate. It is preferred, however, to use a polycarbonate solution containing from about 7 to about 20% polycarbonate. It is preferred that the same solvent be used in the polycarbonate and precipitating solutions, however, it is possible to use two or more different solvents if desired.

The following description in relation to the accompanying drawing will further define the particulars of the present invention. The accompanying drawing illustrates a schematic illustration of a preferred embodiment of the present invention. Parts and percentages in all the examples are by weight unless otherwise specified.

EXAMPLE 1

A 10% polycarbonate solution (made by the phosgenation of Bisphenol A in a methylene chloride solvent in accordance with the process disclosed in U.S. Patent 3,028,365) is added to a mixing vessel 4 containing therein a precipitating solution which comprises a polycarbonate solvent and a polycarbonate non-solvent. The precipitating solution used contains about 44% methylene chloride and about 56% heptane. This precipitating solution is added to the mixing vessel at a continuous rate of about 300 lbs./hr. while the 10% polycarbonate solution is added from supply tank 1 through pump 2 to the mixing vessel 4 at a continuous rate of about 100 lbs./hr. The temperature during the mixing of the polycarbonate solution and the precipitating solution is maintained by a heating jacket at about 25 to 30° C. The components are agitated continuously by agitator 14 and heated so that about 90 lbs./hr. of methylene chloride is distilled off through column 5 and a mixture or slurry obtained in the mixing vessel 4 which contains about 10 parts polycarbonate solids, about 132 parts methylene chloride and about 168 parts heptane. This allows about 310 lbs./hr. of the resulting slurry to pass via conduit 8 to a filtering means 9. The slurry comprises precipitated polycarbonate in the non-solvent-solvent mixture. The slurry is filtered to remove the solid polycarbonate and the resulting filtrate is passed via conduit 11 from the filtering means and recycled through pump 12 and conduit 13 to the mixing vessel 4 at a continuous rate of about 300 lbs./hr. The solid polycarbonate filtered is collected in collection means 10. The liquid portion of this recycled filtrate comprises about 44% methylene chloride and about 56% heptane; this filtrate also contains therein unrecovered polycarbonate. This solution is then continuously recycled and mixed with a fresh supply of a 10% polycarbonate solution. The above procedure is continued as long as is desired. The solvent concurrently removed during the mixing in vessel 4 is condensed through condenser 6 and may be collected through line 7 and recycled to the polycarbonate production system.

The following table includes Examples 2 to 5 which were conducted in a manner similar to the above defined process of Example 1. The amounts and percentages of components varied as indicated.

In the above examples, the content of the filtrate is indicated in terms of the percentage methylene chloride and the percentage heptane. It should be understood that

| Example | Polycarbonate solution mixed | Precipitating solution mixed | Addition rate of polycarbonate solution | Addition rate of precipitating solution | Amount of solvent removed | Content of slurry after removal of solvent and mixing | After filtration recycle rate of filtrate to mixing vessel | Content of recylced filtrate |
|---|---|---|---|---|---|---|---|---|
| 2 | 15% p.c. / 85% m.c. | 39% m.c. / 61% hep. | 100 lbs./hr. | 400 lbs./hr. | 85 lbs./hr. | 15 lbs. p.c. / 156 lbs. m.c. / 244 lbs. hep. | About 400 lbs./hr. | 39% m.c. / 61% hep. |
| 3 | 20% p.c. / 80% m.c. | 56% m.c. / 44% hep. | 100 lbs./hr. | 300 lbs./hr. | 80 lbs./hr. | 20 lbs. p.c. / 168 lbs. m.c. / 133 lbs. hep. | About 300 lbs./hr. | 56% m.c. / 44% hep. |
| 4 | 25% p.c. / 75% m.c. | 49% m.c. / 51% hep. | 100 lbs./hr. | 1,150 lbs./hr. | 75 lbs./hr. | 25 lbs. p.c. / 561 lbs. m.c. / 589 lbs. hep. | About 1,150 lbs./hr. | 49% m.c. / 51% hep. |
| 5 | 25% p.c. / 75% m.c. | 38% m.c. / 62% hep. | 100 lbs./hr. | 260 lbs./hr. | 75 lbs./hr. | 25 lbs. p.c. / 99 lbs. m.c. / 161 lbs. hep. | About 260 lbs./hr. | 38% m.c. / 62% hep. | p.c.=polycarbonate. m.c.=methylene chloride. hep.=heptane.

this percentage content is only given as to the liquid portion of the filtrate and does not indicate the amount of unrecovered polycarbonate that may be dissolved and/or dispersed in the solution. Although specific solvents, non-solvents, polycarbonate solutions and conditions have been specified in the above examples, the other components and conditions discussed in the disclosure give results similar to those indicated in the above examples.

Although the invention has been described in considerable detail for the purpose of illustration, it is to be understood that variations can be made by those skilled in the art without departing from the spirit of the invention and scope of the claims.

What is claimed is:

1. A continuous process for separating polycarbonate from its solvent in a solution which comprises continuously mixing in a mixing means a polycarbonate solution and a precipitating solution, said precipitating solution comprising a polycarbonate solvent and a polycarbonate non-solvent, said solvent being miscible with and having a boiling point lower than the boiling point of said non-solvent, maintaining a temperature during said mixing of at least above the boiling point of said polycarbonate solvent, while concurrently removing from said mixing vessel substantially that amount of solvent which is introduced to said mixing vessel via said polycarbonate solution to form a mixture containing from about 1 to about 15 parts by weight of precipitated polycarbonate, from about 35 to about 65 parts by weight of solvent and from about 35 to about 65 parts by weight of polycarbonate non-solvent, separating from the resulting mixture said precipitated polycarbonate and continuously recycling the remaining solution to said mixing means where it is mixed with fresh polycarbonate solution.

2. The process of claim 1 wherein said polycarbonate solution contains from about 1 to 40% by weight of polycarbonate and the remainder polycarbonate solvent.

3. A continuous process for separating polycarbonate from its solvent in a solution which comprises continuously mixing in a mixing means a heated polycarbonate solution and a precipitating solution, said precipitating solution comprising a polycarbonate solvent and a polycarbonate non-solvent, said solvent being miscible with and having a boiling point lower than the boiling point of said non-solvent, maintaining a temperature during said mixing of at least above the boiling point of said polycarbonate solvent, while concurrently removing from said mixing vessel substantially that amount of solvent which is introduced to said mixing vessel via said polycarbonate solution to form a mixture containing from about 1 to about 15 parts by weight of precipitated polycarbonate, from about 35 to about 65 parts by weight of solvent and from about 35 to about 65 parts by weight of polycarbonate non-solvent, separating from the resulting mixture said precipitated polycarbonate and continuously recycling the remaining solution to said mixing means where it is mixed with heated fresh polycarbonate solution.

4. A continuous process for the substantially complete recovery of polycarbonate from solution which comprises continuously mixing in a mixing vessel a polycarbonate solution and a precipitating solution at a temperature above the boiling point of the solvent in said polycarbonate solution, said precipitating solution comprising a polycarbonate solvent and a polycarbonate non-solvent, said solvent being miscible with and having a boiling point lower than the boiling point of said non-solvent, mixing said streams while concurrently volatilizing off from said mixing vessel that amount of solvent which is introduced to said mixing vessel via said polycarbonate solution to obtain a slurry containing from about 1 to about 15% by weight of precipitated polycarbonate, from about 35 to 65% by weight of polycarbonate non-solvent and from 35 to 65% by weight of polycarbonate solvent, passing said resulting slurry to a separation means whereby the precipitated polycarbonate in said slurry is separated and recovered, and continuously recycling the remaining solution to said mixing vessel where it is continuously mixed with a fresh supply of polycarbonate solution.

5. The process of claim 4 wherein said polycarbonate solution contains from about 1 to 40% by weight of polycarbonate.

6. The process of claim 4 wherein said solvent is selected from the group consisting of methylene chloride, tetrachloroethane, chloroform, trichloroethane, 1,2-dichloroethane, thiophene, dioxane, tetrahydrofuran, chlorobenzene, dichlorobenzene and mixtures thereof.

7. The process of claim 4 wherein said non-solvent is selected from the group consisting of aliphatic hydrocarbons having from about 5 to 20 carbon atoms, acetone, ethyl acetate, toluene, trichloroethylene, carbon tetrachloride, nitromethane, acetonitrile, 1,1-dichloroethane, dialkyl carbonates, normally liquid alcohols and mixtures thereof.

8. The process of claim 4 wherein said polycarbonate solution contains from about 7 to 20% by weight of polycarbonate and the remainder solvent.

9. A continuous process for the recovery of polycarbonate from a solution which comprises continuously mixing in a mixing vessel a polycarbonate solution and a precipitating solution, said precipitating solution comprising methylene chloride and a polycarbonate non-solvent, said non-solvent being miscible with and having a boiling point at least above 40° C., adding said components to said mixing vessel while heating and agitating at such rate that the residence time in said mixing vessel is from about 20 minutes to about 5 hours, while concurrently volatilizing off substantially that amount of solvent which is initially introduced into said mixing vessel via said polycarbonate solution to form a mixture containing precipitated polycarbonate in an amount of from about 1 to about 15% by weight of said mixture and the liquid portion of said resulting mixture comprising from about 35 to 65% by weight of polycarbonate non-solvent and the remainder methylene chloride, passing this resulting mixture to a filtration means whereby the precipitated polycarbonate is filtered off and removed from said mixture and the remaining filtrate recycled to said mixing vessel where it is heated and mixed with a fresh supply of polycarbonate solution.

10. The process of claim 9 wherein said polycarbonate non-solvent is heptane.

11. The process of claim 9 wherein said non-solvent is hexane.

References Cited by the Examiner

UNITED STATES PATENTS 2,989,503  6/1961  Jibben _____ 260—47

FOREIGN PATENTS 897,201  5/1962  Great Britain.

OTHER REFERENCES

Chemical Engineering, Nov. 14, 1960, pp. 174–177.

SAMUEL H. BLECH, *Primary Examiner.*